Patented Mar. 11, 1924.

1,486,592

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

METHOD FOR PRODUCING HYDROCYANIC ACID.

No Drawing. Application filed November 24, 1922. Serial No. 603,922.

*To all whom it may concern:*

Be it known that I, OTTO LIEBKNECHT, a citizen of the Republic of Germany, and resident of Frankfort-on-the-Main, Germany, have invented a certain new and useful Method for Producing Hydrocyanic Acid, of which the following is a specification.

This invention relates to the manufacture of hydrocyanic acid and has for its object to produce a more efficient method of making this acid.

Hydrocyanic acid has been made heretofore by the treatment of a cyanide solution with acids or acid salts and the application of external heat. Such processes are inefficient in requiring the addition of external heat and are inconvenient in the handling of acids. The present invention overcomes these disadvantages. If certain anhydrous salts of metals, whose bases form an unstable cyanide, are treated with a suitable cyanide in the presence of water, the hydration heat of said metal salts is sufficient to drive off the hydrocyanic acid. It has been discovered that the evolution of hydrocyanic acid is favorably promoted if such quantities of suitable salts for example, magnesium sulphate are added to the cyanide that the water remaining after the reaction is complete or nearly complete exists as water of crystallization so that after the reaction products have cooled, a more or less dry salt mixture remains.

In many cases it has been found advisable to add in addition to the materials specified above, additional salts, inactive as regards the desired reaction involving evolution of hydrocyanic acid and anhydrous or low in water content and which form compounds containing water of crystallization such as for example anhydrous sodium sulphate or calcium chloride.

The heat of hydration of these salts which are added for the purpose of binding water can, of course, be utilized in accordance with the discovery disclosed in my prior application, Serial No. 496,046.

As an example of the application of my invention, one part by weight of sodium cyanide may be dissolved in 3.3 parts of water. 3.5 to 4.0 parts of anhydrous kieserite (magnesium sulphate) is then added to the solution. After a short time a violent reaction leads to a rapid and substantially complete evolution of hydrocyanic acid.

As a further example one can replace the kieserite in part by anhydrous sodium sulphate in quantity sufficient to combine with the water present and then proceed as before.

I claim:

1. The process of making hydrocyanic acid, which comprises treating an alkali metal cyanide and metal salts whose bases form unstable cyanides, with water, such quantities of metallic salts being treated that substantially all the water remaining when the reaction is over exists as water of crystallization.

2. In the process of making hydrocyanic acid from an alkali metal cyanide and metallic salts whose bases form unstable cyanides by treating them with water, that improvement which comprises adding auxiliary salts which supply heat to the reaction but do not retard the evolution of hydrocyanic acid in such a quantity that substantially all the water remaining when the reaction is over is found as water of crystallization.

3. The process of making hydrocyanic acid which comprises treating with water an alkali metal cyanide and magnesium sulphate in such quantity that substantially all of the water remaining when the reaction is over is found as water of crystallization.

4. The process of making hydrocyanic acid which comprises treating with water an alkali metal cyanide, magnesium sulphate, and calcium chloride, the quantity of magnesium sulphate being such that only water of crystallization remains when the reaction is over.

5. The process of making hydrocyanic acid which comprises treating magnesium sulphate with a solution of sodium cyanide containing sufficient water for the heat of hydration of the magnesium sulphate to drive off the hydrocyanic acid formed, said magesium sulphate being added in a quantity sufficient to have all the water remaining when the reaction is finished, exist as water of crystallization.

6. The process of making hydrocyanic acid which comprises treating magnesium sulphate, and calcium chloride, with a solution of sodium cyanide containing enough water for the heat of hydration of the salts to drive off hydrocyanic acid formed, the quantity of magnesium sulphate being sufficient to retain all the water existing when the reaction is over as water of crystallization.

7. The process of making hydrocyanic acid which comprises treating with water an alkali metal cyanide, magnesium sulphate, and calcium chloride, the quantity of magesium sulphate being such that only a substantially dry residue remains when the reaction is over.

In testimony whereof I have signed my name to this specification in the presence of two subscribing witnesses.

OTTO LIEBKNECHT.

Witnesses:
C. C. L. B. WYLES,
BASIL E. SAVARD.